United States Patent
Knecht et al.

(10) Patent No.: US 6,651,547 B2
(45) Date of Patent: Nov. 25, 2003

(54) GUIDE FOR THE PISTON ROD OF A PISTON-CYLINDER ASSEMBLY

(75) Inventors: Heinz Knecht, Eitorf (DE); Werner Kuchheuser, Windeck-Stromberg (DE)

(73) Assignee: Mannesmann Sachs AG, Eitorf (DE)

( * ) Notice: Subject to any disclaimer, the term of this patent is extended or adjusted under 35 U.S.C. 154(b) by 126 days.

(21) Appl. No.: 09/942,443

(22) Filed: Aug. 30, 2001

(65) Prior Publication Data

US 2002/0046649 A1 Apr. 25, 2002

(30) Foreign Application Priority Data

Sep. 1, 2000 (DE) .......................................... 100 43 050

(51) Int. Cl.⁷ ................................................ F01B 31/00
(52) U.S. Cl. ................................. 92/86; 92/82; 92/168
(58) Field of Search ................................ 92/86, 165 R, 92/168, 82, 166

(56) References Cited

U.S. PATENT DOCUMENTS 4,987,826 A * 1/1991 Deppert et al. ........... 92/165 R
5,178,243 A * 1/1993 Hamada et al. ........... 92/165 R
5,224,573 A * 7/1993 Amemiya et al. ......... 92/165 R
5,765,666 A * 6/1998 Provence et al. ......... 92/165 R

FOREIGN PATENT DOCUMENTS

DE        198 13 240        8/1999

* cited by examiner

Primary Examiner—Edward K. Look
Assistant Examiner—Michael Leslie
(74) Attorney, Agent, or Firm—Cohen, Pontani, Lieberman & Pavane

(57) ABSTRACT

Guide for the piston rod of a piston-cylinder assembly, especially for a vibration damper, a shock-absorbing strut, or a level-control element, where the guide body holds the cylinder tube and the outside tube and simultaneously centers the piston rod in a central bore. The guide body has two axially spaced sealing elements which rest on the outside surface of the piston rod and seal off the interior space of the piston-cylinder assembly from the atmosphere. A flow connection, starting from the area of the intermediate space between the seals, extends to the interior space and is provided with a nonreturn valve, through which a flow can proceed only in the direction of the interior space.

5 Claims, 3 Drawing Sheets

GUIDE FOR THE PISTON ROD OF A PISTON-CYLINDER ASSEMBLY

BACKGROUND OF THE INVENTION

1. Field of the Invention

The invention pertains to a guide for the piston rod of a piston-cylinder assembly, especially for a level-control element operating with internal pressure, where a guide body holds the cylinder tube and the outside tube and simultaneously centers the piston rod in its central hole. The guide body has at least two axially spaced sealing elements, which rest on the outside surface of the piston rod and seal off the interior space of the piston-cylinder unit from the atmosphere.

2. Description of the Related Art

Guides and seals of this type for the piston rods of hydraulic, pneumatic, and hydropneumatic assemblies are already known (DE 198 13 240). This guide is provided with at least one piston rod seal, where the piston rod, which is usually connected to a damping piston, is centered in the cylinder by this guide and sealed but is guided with freedom of axial movement.

Self-pumping hydropneumatic shock-absorbing struts with internal level control are also known, in which the damping medium-filled working cylinders are under the pressure of at least one gas cushion provided in a high-pressure chamber and acting as a spring. In piston-cylinder assemblies in which the working space is under pressure, the problem has been encountered that the installation space available in motor vehicles is so limited that only piston-cylinder assemblies with very small housing diameters and thus also with small piston rod diameters can be used. To provide the same performance capacity, the internal operating pressure of the piston-cylinder assembly must therefore be considerably increased. The essential weak point in piston-cylinder assemblies such as this is the sealing of the piston rod, which is able to move axially in the guide. The previously known seals no longer have adequate service lives at the required operating pressures of approximately 50–150 bars; the increased coefficients of friction of the seal against the surface of the piston rod arising from the high internal pressure also impair the smoothness of the ride. This is not tolerated by automobile manufacturers.

SUMMARY OF THE INVENTION

It is therefore the object of the present invention to improve the piston rod guide with an appropriate piston rod seal in such a way that a sufficiently leak-proof and durable seal is created, even at high operating pressures in the interior of the piston-cylinder assembly.

To achieve this object, a flow connection extends between the intermediate space between the two high-pressure seals and the interior space of the assembly.

According to an essential feature, it is provided that the flow connection is provided with a nonreturn valve, through which a flow can proceed toward the interior space.

Additional elaborations provide that, in the case of a level-control element operating with internal pressure, the flow connections lead to a low-pressure tank space or to the high-pressure working space.

In the case of designs in which the intermediate space between the seals is connected to the high-pressure working space, the nonreturn valve blocks the flow in the direction of the intermediate space between the seals.

For friction and wear reasons, the primary seal is made to allow leakage into the intermediate space between the seals. The pressure rises as a result of the leaking oil and, during the operation of the vehicle, is decreased again via the flow connection and the nonreturn valve at the baseline pressure minus the pressure reductions which result in the cylinder tube at high pressure damping velocities. As a result, the secondary seal can be designed for low friction and low wear at lower pressures.

In designs in which the intermediate space between the seals is connected to the low-pressure space of the piston-cylinder assembly, a nonreturn valve is also installed in this flow connection to block the flow toward the intermediate space. In this design, too, the primary seal is made for friction and wear reasons in such a way with respect to form and material that leakage is possible into the intermediate space between the seals. The pressure, which rises as a result of the leaking oil, is decreased during the operation of the vehicle via the flow connection and the nonreturn valve preferably in the upward-adjusted state (baseline pressure minus reduction caused by the transport of oil). As a result of this measure, too, the secondary seal can be designed for low friction and low wear at lower pressures.

In accordance with an embodiment which is easy to manufacture, it is provided that the nonreturn valve consists of a valve seat provided in the end surface of the guide and an elastic valve disk, which is installed at the end of the flow connection leading to the interior space.

In another design, the nonreturn valve is introduced as a modular unit into the flow connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
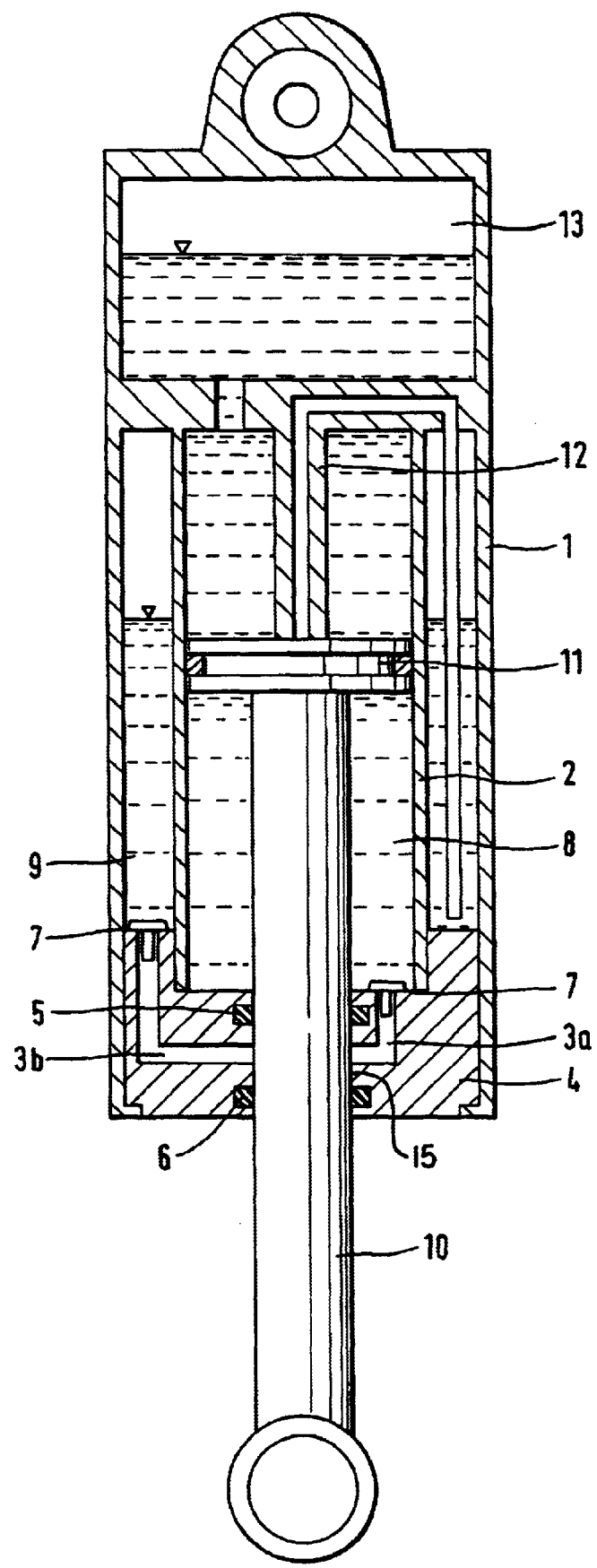
FIG. 1 shows possible flow connections in a piston rod guide with a nonreturn valve for use in a level-control element.

FIG. 1 shows a piston-cylinder-assembly in the form of a self-pumping level-control element. The piston rod 10 is provided with a damping piston 11 in the working cylinder 2, is centered by the guide body 4, and is sealed off against the atmosphere by means of the seals 5, 6, which are arranged in a row in the axial direction. The pumping and control devices 12 and the high-pressure elastic space 13 of the self-pumper are merely suggested.

In the area of the guide 4, on the right side, the course of a flow connection 3a, starting from the intermediate space 15 between the seals 5, 6, and leading to the working space 8, is shown. The flow connection 3a is provided with a nonreturn valve 7, which prevents fluid from escaping from the working space 8 of the working cylinder 2, but which allows leaking oil, which has passed by the primary seal 5 and arrives in the intermediate space 15 between the seals, to flow back to the working space 8 of the piston-cylinder assembly via the flow connection 3a and the nonreturn valve 7 when the pressure gradient allows.

A flow connection 3b connects the intermediate space 15 between the seals 5, 6 to the low-pressure space 9 between working cylinder 2 and outside tube 1. The flow connection 3b is provided with a nonreturn valve 7, which prevents fluid from escaping from the low-pressure space 9 but allows leaking oil, which has passed by the primary seal 5 and arrives in the intermediate space between the seals, to flow back to the low-pressure space 9 of the piston cylinder assembly via the flow connection 3b and the nonreturn valve 17 when the pressure gradient allows.

Figure 2:
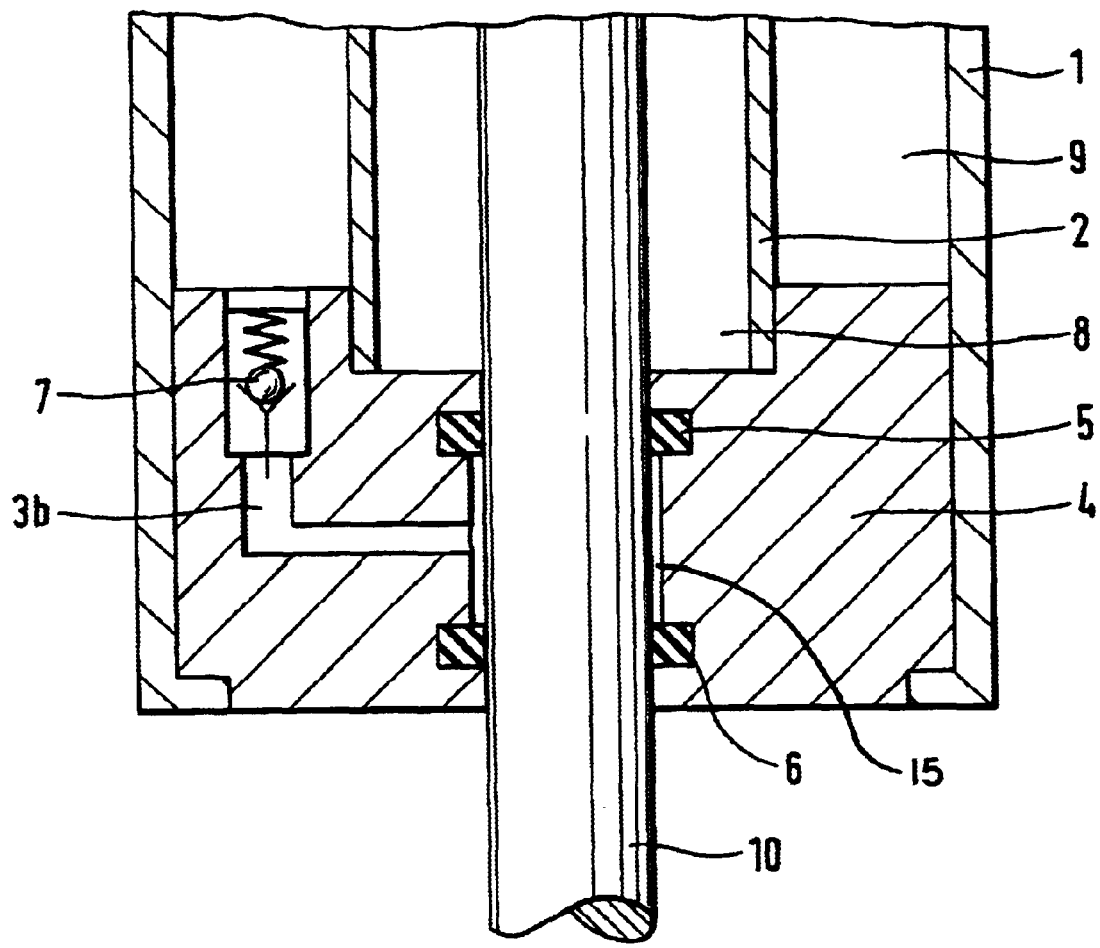
FIG. 2 shows a detailed view of a flow connection in a piston rod guide together with a nonreturn valve between the intermediate space between the seals and the working space.

FIG. 2 shows a detailed view of a guide 4, where the flow connection 3b leads from the intermediate space 15 via the nonreturn valve 17 to the low-pressure space 9. By way of example, the nonreturn valve 17 is installed as a structural unit in the flow connection 3b.

Figure 3:
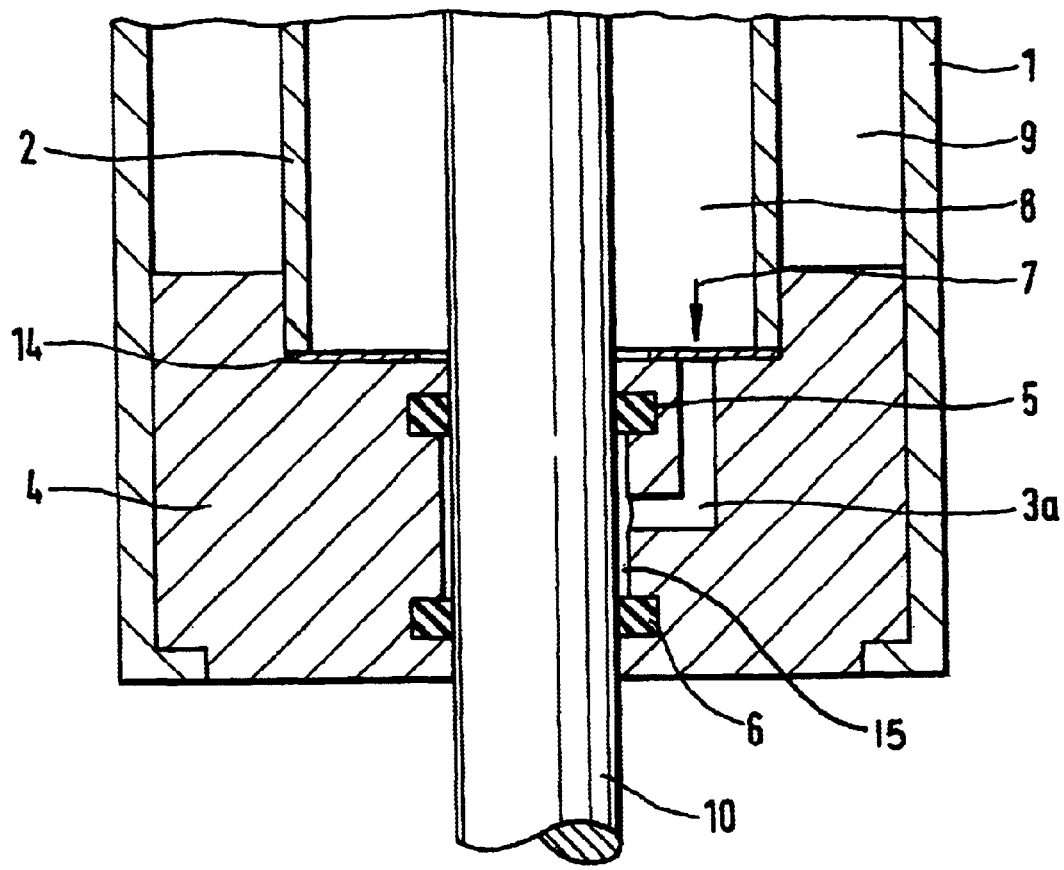
FIG. 3 shows a detailed view of a flow connection in a piston rod guide together with the nonreturn valve between the intermediate space between the seals and the low-pressure space in a level-control element.

FIG. 3 shows an embodiment in which the flow connection 3a in the guide 4 starts at the intermediate space 15 between the two seals 5, 6 and leads via the nonreturn valve 7 to the working space 8 of the piston-cylinder assembly. The nonreturn valve 7 is shown here as a disk valve, which blocks flows in the direction of the intermediate space 15. At appropriate pressure gradients between the intermediate space 15 and the working space 8, the disk valve 7 opens.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A guide for the guide rod of a piston-cylinder assembly, said guide comprising a guide body having a central bore for receiving a piston rod, an end surface which supports a working cylinder surrounding a working space and an outside tube surrounding a low pressure space, a pair of axially spaced seals received in said bore and resting against the piston rod to seal off the working space from the atmosphere, an intermediate space being formed between said guide body, said seals, and said piston rod, at least one flow connection extending from said intermediate space to at least one of said working space and said low pressure space, and a non-return valve in said at least one flow connection, said non-return valve permitting flow toward said at least one of said working space and said low pressure space, wherein said non-return valve is installed in said end surface.

2. A guide as in claim 1 wherein said at least one flow connection consists of a flow connection from said intermediate space to said working space.

3. A guide as in claim 1 wherein said at least one flow connection consists of a flow connection from said intermediate space to said low pressure space.

4. A guide as in claim 1 wherein said non-return valve is a modular unit which is installed in said at least one flow connection.

5. A piston-cylinder assembly comprising a working cylinder surrounding a working space, a piston rod which moves axially in said working cylinder, an outside tube surrounding a low pressure space between said outside tube and said working cylinder, a guide body having a central bore receiving said piston rod, an end surface which supports said working cylinder and said outside tube, a pair of axially spaced seals received in said bore and resting against the piston rod to seal off the working space from the atmosphere, an intermediate space being formed between said guide body, said seals, and said piston rod, at least one flow connection extending from said intermediate space to at least one of said working space and said low pressure space, and a non-return valve in said at least one flow connection, said non-return valve permitting flow toward said at least one of said working space and said low pressure space, wherein said non-return valve is installed in said end surface.

* * * * *